3,364,223
HALOGENATED THIOPYRIDINES
Howard Johnston, Walnut Creek, Calif., assignor to The Dow Chemical Company, Midland, Mich., a corporation of Delaware
No Drawing. Continuation-in-part of application Ser. No. 444,861, Apr. 1, 1965. This application Dec. 29, 1966, Ser. No. 605,549
7 Claims. (Cl. 260—294.8)

ABSTRACT OF THE DISCLOSURE

Halogenated thiopyridines corresponding to the formula

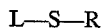

wherein R represents hydrogen, alkali metal, alkyl, monohalolower alkyl, dihalolower alkyl, trihalolower alkyl, phenyl, monohalophenyl, benzyl and monohalo-benzyl, and L represents

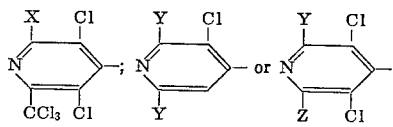

wherein X represents hydrogen or chorine, Y represents bromine, chlorine or fluorine and Z represents hydrogen or Y.

---

This application is a continuation-in-part of my copending application, Ser. No. 444,861, filed April 1, 1965, now Patent No. 3,296,272 granted Jan. 3, 1967 which is a continuation-in-part of application Ser. No. 417,837 filed Dec. 11, 1964 and now abandoned.

The novel compounds of the present invention are halogenated thiopyridines having the formula

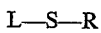

In this and succeeding formulae, R represents hydrogen, alkali metal, alkyl, monohalolower alkyl, dihalolower alkyl, trihalolower alkyl, phenyl, monohalophenyl, benzyl or monohalobenzyl; and L represents one of the radicals

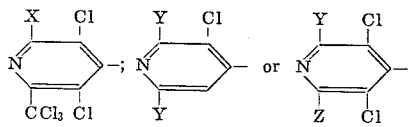

wherein X represents chlorine or hydrogen, each Y represents chlorine, bromine or fluorine, and Z represents Y or hydrogen.

The term alkali metal as employed in the present specification and claims refers to sodium and potassium. The term "alkyl" as employed in the present specification and claims designates an alkyl group containing 1, 2, 3, 4, and up to 12 carbon atoms, and from 1 to 2, to 3, to 4, to 5, to 6, and up to and including 12 carbon atoms such as dodecyl, octyl, heptyl, hexyl, sec.-hexyl, butyl, decyl, 4-methyldecyl, undecyl, nonyl, isobutyl, tert.-butyl, isoamyl, amyl, propyl, ethyl, isopropyl, 3-ethylnonyl, 2-ethylhexyl, and 3-propylheptyl. The expression "lower alkyl" is employed in the present specification and claims to designate an alkyl group containing 1, 2, 3, 4, or 5 carbon atoms, and from 1 to 2, to 3, to 4, to 5 carbon atoms such as methyl, ethyl, isopropyl, propyl, tert.-butyl, butyl, amyl, sec.-amyl, etc. Also, the terms "monohalolower alkyl," "dihalolower alkyl," "trihalolower alkyl," "halophenyl" and "halobenzyl" represent lower alkyl, phenyl or benzyl moieties substituted with bromine or chlorine. Representative halo-lower alkyl moieties include omega-trihalo-loweralkyl; omega-dihaloloweralkyl, omega-halo-lower alkyl; alpha-halo-loweralkyl; alpha-dihalo-lower alkyl; 2,3-dihalo-propyl, butyl or amyl; 2,2,3-trihalopropyl, butyl or amyl; 3,4-dihalobutyl; 3,4-dihaloamyl, 4,5-dihaloamyl; 2,3,4-trihalobutyl, 3,4,4-trihalobutyl, etc.

For convenience those compounds of the invention wherein R is hydrogen are hereinafter called halopyridyl mercaptans; those compounds wherein R is alkali metal are called halopyridyl mercaptan alkali metal salts; and all other compounds of the invention are called halopyridyl sulfides.

The new compounds of the present invention have been found to be useful as pesticides for the control of various pests such as bacteria, fungi, nematodes, insects, crustaceans, and aquatic and terrestrial plants. Representative pests include root knot nematodes, cockroaches, confused flour beetles, daphnia, crabgrass, salvinia, bean mildew, *Candida pelliculosa, Pullularia pullulans, Staphylococcus aureus* and potato scab.

The new compounds of the present invention are prepared by a variety of methods. In those cases wherein R represents R' and R' is alkyl, phenyl, monohalo-phenyl, benzyl, or monohalo benzyl, an alkali metal mercaptan salt having the formula

is reacted with a halopyridine compound corresponding to one of the formulae

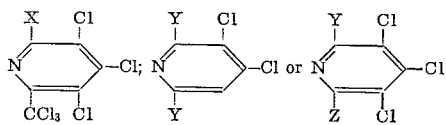

The reaction proceeds readily at temperatures of from 60° C. to 100° C. with the production of the desired halopyridyl sulfide products and the alkali metal halide of reaction. In such a procedure, the reactants are intimately contacted together in an inert organic liquid as reaction medium. Representative inert organic liquids include ethanol, methanol, isopropanol, dimethylsulfoxide and dimethoxyethane. Water can also be employed as the reaction medium, however, the organic liquids are preferred. The reaction consumes the reactants in equimolar proportions and the use of substantially equimolar proportions is preferred. The use of the alkali metal mercaptan in molar amounts substantially in excess of the molar amount of halopyridine results in the formation of bis-thiosubstituted compounds with the attendant decrease in yield of the halopyridyl sulfides of the present invention.

During or following the contacting of the reactants, the reaction mixture is maintained at a temperature within the reaction temperature zone for several hours. In a convenient procedure, the reaction mixture can be maintained at the reaction temperature until there is a cessation in the precipitation of the alkali metal halide of reaction. Following the reaction period the reaction mixture is filtered to remove the alkali metal halide of reaction and the filtrate thus obtained concentrated to induce the precipitation of the halopyridyl sulfide product and the precipitated product isolated by filtration, decantation or centrifugation. In alternate isolation procedures, the filtered reaction mixture is fractionally distilled to obtain the product as a distillation product or concentrated to dryness to obtain the product as a residue. In yet another isolation procedure, the reaction mixture is poured into water whereupon the halopyridyl sulfide precipitates in the aqueous mixture and the precipitated product is then separated by filtration, centrifugation or decantation.

Representative halopyridines employed as starting materials include: 2,3,4,6-tetrachloropyridine, 2,6-dibromo-3,4,5-trichloropyridine, 2-fluoro-3,4,5-trichloropyridine, 2-trichloromethyl-3,4,5,6-tetrachloropyridine, 2-trichloromethyl-3,4,5-trichloropyridine, 2-bromo-3,4,5-trichloropyridine, 2-trichloromethyl-3,4,6-trichloropyridine, 2-fluoro-3,4,5,6-tetrachloropyridine, 2,6-difluoro-3,4,5-trichloropyridine, 2,3,4,5,6-pentachloropyridine and 2-bromo-3,4,5,6-tetrachloropyridine.

In an alternative method for the production of these halopyridyl sulfides, the halopyridine compounds employed in the preceding method are reacted with alkali metal sulfide to prepare the mercaptan of the corresponding pyridines wherein the mercapto group enters the 4-position on the pyridine nucleus. These mercaptans are thereafter reacted with a suitable halide (R′X) to obtain the desired halopyridyl sulfides. Where it is desired to obtain the halopyridyl sulfides wherein R represents R″ and R″ is monohalolower-alkyl, dihalolower-alkyl or trihalolower-alkyl, the mercaptans of the pyridines prepared as described above are reacted with an equimolar quantity of a suitable halo substituted material (R″X).

The reaction between the alkali metal sulfide and the halopyridine is carried out at temperatures between 65° and 110° C. and preferably at temperatures between 80° and 100° C. The reaction of the halopyridyl mercaptan alkali metal salt with the suitable halide generally proceeds readily at temperatures of from 80 to 120° C. However, when halo-benzenes are being employed the reaction is carried out under pressure at temperatures of about 150° C. or greater. When R represents a halo-loweralkyl such as monohalolower alkyl, dihalolower alkyl or trihalolower alkyl, the reaction proceeds readily at temperatures between 60° and 120° C. In converting the halopyridine to the halopyridyl mercaptan alkali metal salt, the reaction consumes the reactants in equimolar proportions and optimum yields are obtained by the use of such proportions. However, slight excesses of alkali metal sulfides (about 10 percent) do not adversely affect the yields. Likewise, the conversion of the halopyridyl mercaptan alkali metal salts to the corresponding sulfide derivatives consumes equimolar proportions of alkali metal salt and halide, and the use of such proportions is preferred. However, a slight excess (about 10 percent) of the halide, with respect to the halopyridyl mercaptan alkali metal salts, can be employed without adversely affecting the yields. Representative alkali metal sulfides employed as starting materials include sodium sulfide and potassium sulfide.

In carrying out the production of the halogenated thiopyridines of the present invention by this alternate method, the halopyridine and the alkali metal sulfide are admixed in any order or fashion in the presence of an organic liquid as reaction medium. The temperature of the reaction mixture thus obtained is maintained in the reaction temperature zone for a few hours. At this point the halopyridyl mercaptan alkali metal salt compounds of the present invention can be readily isolated from the reaction mixture by evaporation to dryness. However, in a convenient procedure the halopyridyl mercaptan alkali metal salt is reacted in situ with suitable halide to produce the corresponding halopyridyl sulfide. In such a procedure, the suitable halide is added to the reaction mixture containing the halopyridyl mercaptan alkali metal salt and the reaction mixture thus obtained maintained at a temperature in the reaction temperature range for a few hours. Conveniently, reaction conditions are maintained until there is a substantial cessation in the precipitation of the alkali metal halide of reaction. Following the reaction period, the desired halopyridyl sulfide product is separated from the reaction mixture as previously described.

Alkali metal salts such as the sodium or potassium salts of the following mercaptans are reacted with a suitable halide to obtain the halopyridyl sulfide products of the present invention: 2,3,6-trichloro-4-pyridyl mercaptan, 2,3,5,6-trichloro-4-pyridyl mercaptan, 2-trichloromethyl-3,5,6-trichloro-4-pyridyl mercaptan, 2,3,5,6-tetrachloro-4-pyridyl mercaptan, 2,6-difluoro-3,4-dichloro-4-pyridyl mercaptan, 2,6-difluoro-3-chloro-4-pyridyl mercaptan, 2-bromo-3,6-dichloro-4-pyridyl mercaptan, 2-bromo-3,5-dichloro-6-fluoro-4-pyridyl mercaptan, 2-bromo-3,5,6-trichloro-4-pyridyl mercaptan, and 2,6-dibromo-3,5-dichloro-4-pyridyl mercaptan.

The halopyridyl mercaptan alkali metal salts can be easily converted to the corresponding halopyridyl mercaptan corresponding to the formula

L—S—H

In such a procedure, the alkali metal salt is dispersed in an acid aqueous media whereupon the free —SH compound will precipitate. The precipitated product can be isolated by convenient procedures such as filtration, decantation or centrifugation.

In still another procedure, the halopyridine mercaptans are prepared by reacting a halopyridine with sodium or potassium hydrosulfide. The reaction is carried out under the same conditions as herein described for the production of the halopyridyl mercaptan alkali metal salts from a halopyridine and alkali metal sulfide.

The halopyridyl sulfide alkali metal salts can also be prepared by reacting sodium, potassium, sodium hydroxide or potassium hydroxide with a halopyridyl mercaptan corresponding to one of the formulas.

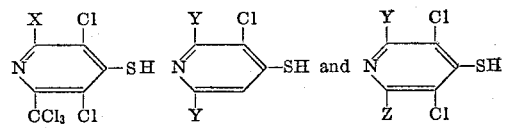

The reaction is carried out in an organic liquid as reaction medium and takes place readily at temperatures between 25° and 100° C. In a convenient procedure, the reaction is carried out at the boiling temperature of the reaction mixture. The proportions of the reactants to be employed are not critical, some of the desired product being formed upon contacting the reactants in any proportions. However, the reaction consumes the reactants in equimolar proportions and the use of substantially equimolar proportions is preferred. In carrying out the production of the alkali metal salt compound the reactants are contacted in any order or fashion in the liquid reaction medium. Following the contacting of the reactants the reaction mixture is maintained at a temperature within the reaction temperature range for a short period of time. Thereafter, the reaction mixture is subjected to evaporation to remove the low boiling constituents and obtain the product as a solid or oily residue.

The following examples are merely illustrative and are not to be construed as limiting.

*Example 1*

2,3,4,5-tetrachloropyridine (101 grams; 0.5 mole) and sodium hydrosulfide (28 grams; 0.5 mole) are dispersed with stirring in 500 milliliters of ethanol. The reaction mixture thus prepared is heated at 65° C. for 6 hours. Following the heating period, the reaction mixture is filtered to remove the halide of reaction and the filtrate concentrated to dryness to obtain the 2,3,5-trichloro-4-pyridyl mercaptan product as a solid residue. This residue is recrystallized from ethanol, 2,3,5-trichloro-4-pyridyl mercaptan melts at 67° C.

*Example 2*

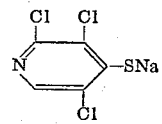

Sodium (3.2 grams; 0.14 mole) was dissolved in 175 milliliters of methanol. To the resulting methanol solution, 2,3,5-trichloro-4-pyridyl mercaptan (30.0 grams; 0.14 mole) was added with stirring and the resulting solution heated at the boiling temperature and under reflux for three hours. Following the heating period, the reaction mixture was subjected to evaporation in vacuo to obtain a crystalline solid residue. This crystalline solid residue was found to melt at >250° C. and infrared analysis confirmed the identity of the crystalline solid residue as being 2,3,5-trichloro-4-pyridyl mercaptan sodium salt.

*Example 3*

2,3,5-trichloro-4-pyridyl mercaptan sodium salt (10 grams; 0.0423 mole) was dissolved in 50 milliliters of dimethoxyethane. To the solution thus prepared 1,2-dibromoethane (15.9 grams; 0.0846 mole) was added, with stirring, slowly and portionwise over a period of two hours. During the addition of the 1,2-dibromoethane the reaction mixture was maintained at room temperature. Following the contacting of the reactants, the reaction mixture was filtered to remove the solid sodium bromide which precipitated in the reaction mixture and the filtrate thus obtained was distilled to remove the low boiling constituents and obtain a dark residue. This liquid residue was then dispersed in hexane and the hexane mixture filtered to remove the undissolved solid. The hexane filtrate was then cooled and the crystalline solid product which precipitated during the cooling procedure was separated by filtration and saved. The filtrate thus obtained was evaporated to dryness to obtain additional crystalline solid product. The 2-bromoethyl-2,3,5-trichloro-4-pyridyl sulfide product was found to melt at 43.5° C. (corrected) and to have carbon, hydrogen, bromine, chlorine, nitrogen and sulfur contents of 26.51, 1.63, 24.5, 32.8, 4.66 and 10.1 percent, respectively, by analysis as compared to the theoretical contents of 26.10, 1.57, 24.80, 33.00, 4.36 and 9.98 percent, respectively.

*Example 4*

3,5 - dichloro - 2,4 - difluoropyridine (10 grams; 0.0547 mole) was dissolved in 30 milliliters of dimethoxyethane. Sodium (1.29 grams; 0.0562 mole) was dissolved in 35 milliliters of ethanol and the resulting solution cooled to less than 10° C. and methyl mercaptan (2.8 grams; 0.583 mole) added thereto. The ethanol solution containing the sodium methyl mercaptan was then added slowly dropwise over a period of 25 minutes to the solution of dichloro difluoropyridine in dimethoxyethane. Following the admixing of the reactants, the reaction mixture was heated to the reflux temperature and filtered to remove the salt which had precipitated during the reaction. The filtrate thus obtained was subjected to evaporation in vacuo at 40° C. to remove the low boiling constituents and obtain a residue. This residue was then dissolved in hot hexane and the hexane solution filtered to remove any solid material. The filtered hexane solution was then distilled at atmospheric pressure at 100° C. to remove the low boiling constituents and obtain a residual oil. The oily methyl-3,5-dichloro-2-fluoro-4-pyridyl sulfide compound thus obtained was found to have carbon, hydrogen, chlorine, fluorine, nitrogen, and sulfur contents of 34.92, 2.08, 33.32, 9.76, 6.20 and 14.75 percent, respectively, as compared to the theoretical content of 34.14, 1.43, 33.60, 9, 6.64, and 15.19 percent, respectively.

The following compounds of the present invention (M.P. and M.W. designate melting point and molecular weight, respectively) were prepared in accordance with the methods herein set forth:

3,5-dichloro-2,-6-difluoro-4-pyridyl mercaptan, M.W. 216
2,3,5,6-tetrachloro-4-pyridyl mercaptan, M.P. 157.5–160.5° C.
2,3,5-trichloro-4-pyridyl mercaptan, M.P. 67° C.
2,3,5,6-tetrachloro-4-pyridyl mercaptan sodium salt, M.W. 271.4
2,3,6-trichloro-4-pyridyl mercaptan, M.P. 80° C.
Benzyl 2,3,5,6-tetrachloro-4-pyridyl sulfide, M.W. 339.1
2-bromoethyl 2,3,5-trichloro-4-pyridyl sulfide, M.P. 43.5° C.
5-bromopentyl-2,3,5-trichloro-4-pyridyl sulfide, M.W. 363.6
2-bromo-1-chloroethyl 2,3,5,6-tetrachloro-4-pyridyl sulfide, M.P. 68.5° C.
2-bromoethyl-2-3,5,6-tetrochloro-4-pyridyl sulfide, M.P. 99° C.
sec.-Butyl 2,3,5,6-tetrochloro-4-pyridyl sulfide, M.P. 40.5° C.
Butyl 2,3,5-trichloro-4-pyridyl sulfide, M.W. 270.6
Butyl 3,5-dichloro-2-(trichloromethyl)-4-pyridyl sulfide, M.W. 353.5
Butyl 3,5-dichloro-2,6-difluoro-4-pyridyl sulfide, M.W. 272.7
tert.-Butylthio 2,3,5-trichloro-4-pyridyl sulfide, M.W. 270.6
p-Chlorophenyl 3,5-dichloro-2-(trichloromethyl)-4-pyridyl sulfide, M.W. 408.0
Ethyl 3,5-dichloro-2-(trichloromethyl)-4-pyridyl sulfide, M.W. 325.5
3,5-dichloro-2-(trichloromethyl)-4-pyridyl mercaptan, M.P. 132–134° C.
Octyl 3,5-dichloro-2-(trichloromethyl)-4-pyridyl sulfide, M.W. 409.7
Methyl 3,5-dichloro-2-(trichloromethyl)-4-pyridyl sulfide, M.P. 74–76° C.
2-chloroethyl 2,3,5,6-tetrachloro-4-pyridyl sulfide, M.P. 99.5° C.
Chloromethyl 2,3,5,6-tetrachloro-4-pyridyl sulfide, M.P. 89–91° C.
3-chloropropyl 2,3,5,6-tetrochloro-4-pyridyl sulfide, M.P. 61° C.
Isopropyl 2,3,5,6-tetrachloro-4-pyridyl sulfide, M.P. 42° C.
Hexyl 2,3,5,6-tetrachloro-4-pyridyl sulfide, M.P. 35.5° C.
Isobutyl 2,3,5,6-tetrachloro-4-pyridyl sulfide, M.W. 305.1
Phenyl 2,3,5,6-tetrachloro-4-pyridyl sulfide, M.P. 91.5° C.
Propyl 2,3,5,6-tetrachloro-4-pyridyl sulfide, M.P. 41.0° C.
2-chloroethyl 2,3,5-trichloro-4-pyridyl sulfide, M.P. 37° C.
Chloromethyl 2,3,5-trichloro-4-pyridyl sulfide, M.W. 263
p-Chlorophenyl 2,3,5-trichloro-4-pyridyl sulfide, M.P. 118° C.
Isopropyl 2,3,5-trichloro-2-(trichloromethyl)-4-pyridyl sulfide, M.W. 378
Methyl 2,3,6-trichloro-4-pyridyl sulfide, M.P. 113° C.
Methyl 2,3,5-trichloro-6-(trichloromethyl)-4-pyridyl sulfide, M.P. 57–59° C.
Methyl 2,3,5-trichloro-4-pyridyl sulfide, M.P. 41.2° C.

The compounds of the present invention are useful as pesticides for the control of various bacteria, fungi, nematodes, insects, crustaceans and aquatic and terrestrial plants. For such use, the unmodified compound can be employed. Alternatively, the compound can be dispersed on an inert finely divided solid and the resulting preparation employed as a dust. Also, such compounds or dust compositions containing said compound can be dispersed in water with or without the aid of additional wetting agents and the resulting aqueous dispersions employed as sprays. In other procedures, the compounds can be employed as solutions in petroleum distillates or in other solvents or as a constituent of oil-in-water or water-in-oil emulsions. Such liquid compositions can be employed as sprays, drenches, or washes.

In representative operations pentyl 2,3,5,6-tetrachloro-4-pyridyl sulfide and hexyl 2,3,5,6-tetrachloro-4-pyridyl sulfide each when employed as the sole toxic constituent in liquid compositions which are applied to plots of weeds in amounts sufficient to provide 20 pounds of toxicant per acre gave complete kills of pig weeds. In other operations, methyl - 2-3-5 - trichloro-6-(trichloromethyl)-4-pyridyl sulfide gives complete kills of cotton leaf perforator (*Bucculatrix thurberiella*) when employed as the sole toxicant constituent in liquid compositions and in an amount sufficient to provide the toxicant at a dosage of 30 pounds per acre.

In still further representative operations phenyl 2,3,5,6-tetrachloro-4-pyridyl sulfide when employed as the sole toxicant constituent in aqueous compositions and at a concentration of 100 parts per million by weight of the composition gave complete kills and control of bactrium-fire blight (*Erwinia amylovora*), rice blast, *Basillus cereus* and *Trichlophyton mentagrophytes* when applied to viable growing microorganisms.

The halopyridyl sulfides of the present invention are useful as intermediates for the preparation of new pyridyl sulfones and sulfoxides claimed in my copending application Ser. No. 444,861 filed Apr. 1, 1965. In such operations the halopyridyl sulfides are oxidized by conventional procedures to produce the corresponding pyridyl sulfones or sulfoxides. These pyridyl sulfones and pyridyl sulfoxides are useful as pesticides for the kill and control of various pests such as fungi and bacteria.

I claim:

1. A halogenated thiopyridine compound corresponding to the formula

L—S—R wherein R represents hydrogen, alkali metal, alkyl of from 1–12 carbon atoms, monohalolower, alkyl, dihalo-lower alkyl, trihalolower alkyl, phenyl, monohalophenyl, benzyl or monohalobenzyl and L represents one of the formulas 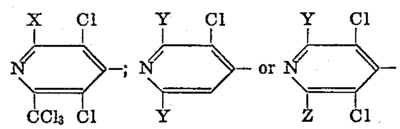 in which X represents hydrogen or chlorine, Y represents bromine, chlorine or fluorine and Z represents hydrogen or Y.

2. The halogenated thiopyridine claimed in claim 1 wherein the compound is methyl 2,3,5,6-tetrachloropyridine-4-pyridyl sulfide.

3. The halogenated thiopyridine claimed in claim 1 wherein the compound is methyl 2,3,5-trichloro-4-pyridyl sulfide.

4. The halogenated thiopyridine claimed in claim 1 wherein the compound is 2,3,5,6-tetrachloro-4-pyridyl mercaptan sodium salt.

5. The halogenated thiopyridine claimed in claim 1 wherein the compound is 2,3,5-trichloro-4-pyridyl mercaptan sodium salt.

6. The halogenated thiopyridine claimed in claim 1 wherein the compound is 2,3,5,6-tetrachloro-4-pyridyl sulfide.

7. The halogenated thiopyridine claimed in claim 1 wherein the compound is chloromethyl 2,3,5,6-tetrachloro-4-pyridyl sulfide.

References Cited

UNITED STATES PATENTS 2,826,584 3/1958 Cislak ____________ 260—294.8

JOHN D. RANDOLPH, *Primary Examiner.*

A. ROTMAN, *Assistant Examiner.*

Disclaimer 3,364,223.—*Howard Johnston*, Walnut Creek, Calif. HALOGENATED THIOPYRIDINES. Patent dated Jan. 16, 1968. Disclaimer filed Oct. 20, 1972, by the assignee, *The Dow Chemical Company*.

Hereby enters this disclaimer to claim 1 of said patent.

[*Official Gazette January 30, 1973.*]